US007745006B2

(12) United States Patent
Barker

(10) Patent No.: US 7,745,006 B2
(45) Date of Patent: Jun. 29, 2010

(54) LOW ODOR, FAST CURE, TOUGHENED EPOXY ADHESIVE

(75) Inventor: Michael J. Barker, Medina, OH (US)

(73) Assignee: Ashland Licensing and Intellectual Property, LLC, Dublin, OH (US)

( * ) Notice: Subject to any disclaimer, the term of this patent is extended or adjusted under 35 U.S.C. 154(b) by 773 days.

(21) Appl. No.: 11/639,539

(22) Filed: Dec. 15, 2006

(65) Prior Publication Data

US 2008/0145667 A1    Jun. 19, 2008

(51) Int. Cl.
*B32B 27/38* (2006.01)
*B32B 27/26* (2006.01)
*C09J 163/00* (2006.01)
*C08L 63/00* (2006.01)

(52) U.S. Cl. ........................ 428/414; 156/330; 428/413; 428/416; 428/418; 523/400; 523/456

(58) Field of Classification Search ....................... None
See application file for complete search history.

(56) References Cited

U.S. PATENT DOCUMENTS 6,743,375 B2 *    6/2004    Schile ................... 252/183.11

* cited by examiner

*Primary Examiner*—Michael J Feely
(74) *Attorney, Agent, or Firm*—Mark A. Montana

(57) ABSTRACT

An epoxy adhesive composition of an epoxy resin and an amine hardener includes a synergistic accelerator of an effective amount of short chain polyol and an effective amount of a dihydric phenol having between about 6 and about 24 carbon atoms. Surfaces of adherends are joined with the dried residue of the epoxy adhesive composition by applying the epoxy resin composition to one or both surfaces, joining the surfaces, and applying pressure, optionally with heating. The joined adherends having the dried epoxy resin composition is another disclosed embodiment.

32 Claims, 4 Drawing Sheets

LOW ODOR, FAST CURE, TOUGHENED EPOXY ADHESIVE

CROSS-REFERENCE TO RELATED APPLICATIONS

None

STATEMENT REGARDING FEDERALLY SPONSORED RESEARCH

Not applicable.

BACKGROUND OF THE INVENTION

The disclosure generally relates to epoxy adhesives and more particularly to a toughened epoxy adhesive with enhanced adhesion to sheet molding compound (SMC).

Sheet molding compound (SMC), for example, is defined (ASTM) as a molding compound in integral sheet form comprising a thermosetting resin, fibrous reinforcement, and additives required for processing or product performance, e.g., resin, catalyst, thickener, mold release agent, particulate filler, pigment, shrink control agent, etc. These materials and others generally are known as fiber-reinforced composites, reinforced composites, or simply composites. Metal may include, but not be limited to, hot dipped galvanized steel, electro galvanized steel, e-coat steel, cold rolled steel, bare aluminum, anodized aluminum, etched aluminum, magnesium, etc.

A common class of structural adhesives useful in adhering metal parts to the same and to different substrates (e.g. composites) is epoxy adhesives. Epoxy adhesive compositions most often contain a polyfunctional epoxy resin and are cured by addition of a curative, which typically is provided in a separate package, often referred to as Part A and Part B. The rate of cure and product characteristics are influenced by the choice of curing agent, which itself is influenced by the make-up of the adhesive composition, as dictated by the final properties desired by the user.

Acceleration of two-part epoxy adhesives has taken many paths over the years, such as, for example, the use of acrylic esters, mercaptans, and hydroxyl groups. The acrylic esters produce a rapid reaction, but typically result in brittle-glassy polymers with low adhesion to SMC. The mercaptans also react vigorously, but result in brittle polymers with low adhesion and have a strong odor. The catalytic affect of hydroxyl groups was first reported by Shechter, et al., *Industrial Engineering and Chemistry*, Vol. 48, No. 1, pp. 94-97 (1956) where a termolecular mechanism was proposed. Phenol was cited as being far more efficient than aliphatic alcohols due to its relative acidity. U.S. Pat. No. 4,129,670 claims the use of dihydric phenols, such as catechol or resorcinol, as epoxy chain extenders that "may reduce the cure time and/or temperature". U.S. Pat. No. 5,385,990 claims the use of substituted aromatic phenols, where the substitution is an electron withdrawing group that causes an increase in the pKa value. This patent cites the previous work of U.S. Pat. No. 4,129,670 and, thus, excludes use of non-substituted aromatic phenols. Their preferred additive is p-chlorophenol, which is quite effective; however, it is plagued by an objectionable strong odor and recently chlorinated compounds, as a class, have been under scrutiny for being hazardous to the environment by automobile manufacturers.

U.S. Pat. No. 6,486,256 B1 cites the use of phenolic compounds as chain extenders, but claims they must be used with amines having only two hydrogen atoms per molecule, be free of polyfunctional curing agents, and must be used along with a base catalyst.

Additional representative epoxy structural adhesive compositions can be found in, for example, U.S. Pat. Nos. 5,385,990, 4,921,912, 4,661,539, 4,740,539, and 4,707,518, the disclosures of which are expressly incorporated herein by reference. Various combinations of epoxy resins, rubber modifiers, amine curing agents, amide curing agents, mercaptan curing agents, etc. have been proposed for formulating high strength adhesive compositions.

BRIEF SUMMARY OF THE INVENTION

Broadly, an adhesive composition comprises an epoxy resin, a curative (e.g., an amine compound), optionally filler, and an accelerator comprising a synergistic combination of dihydric phenol (e.g., resorcinol, catechol) and aliphatic polyol (e.g., glycerin).

Another disclosed embodiment is a method for joining a first substrate having a first surface to a second substrate having a second surface with an adhesive composition. The method includes applying the adhesive composition to one or more of the first surface or the second surface. The adhesive composition comprises an epoxy resin, an amine hardner for the epoxy resin; and a synergistic accelerator comprising an effective amount of short chain polyol and an effective amount of a dihydric phenol having between about 6 and about 24 carbon atoms. The first and second surfaces then are joined. Pressure next is applied to the joined first and second surfaces to cure the adhesive composition. SMC is a prime candidate adherend for joining with the novel adhesive disclosed herein.

Another embodiment is a joined product of a first substrate having a first surface and a second substrate having a second surface, the surfaces being joined by the dried residue of an adhesive composition. The adhesive composition is an epoxy adhesive formed from an epoxy resin, an amine hardner for the epoxy resin, and a synergistic accelerator comprising an effective amount of short chain polyol and an effective amount of a dihydric phenol having between about 6 and about 24 carbon atoms.

One advantage of great commercial note is that combinations of aliphatic polyols and dihydric phenols in an epoxy formulation create synergy for achieving rapid reaction with reduced brittleness and enhanced adhesion to SMC. Another advantage is a new two-part toughened epoxy adhesive that provides an enhanced reaction rate with good adhesion to SMC. A further advantage is that the novel adhesive does not suffer from brittle-glassy failure typically associated with fast cure epoxy adhesives nor excessive odor. These and other advantages will be readily apparent to those skilled in this art based on the disclosure set forth herein.

BRIEF DESCRIPTION OF THE DRAWINGS

For a fuller understanding of the nature and advantages of the disclosure set forth herein, reference should be had to the following detailed description taken in connection with the accompanying drawings, in which.

Figure 1:
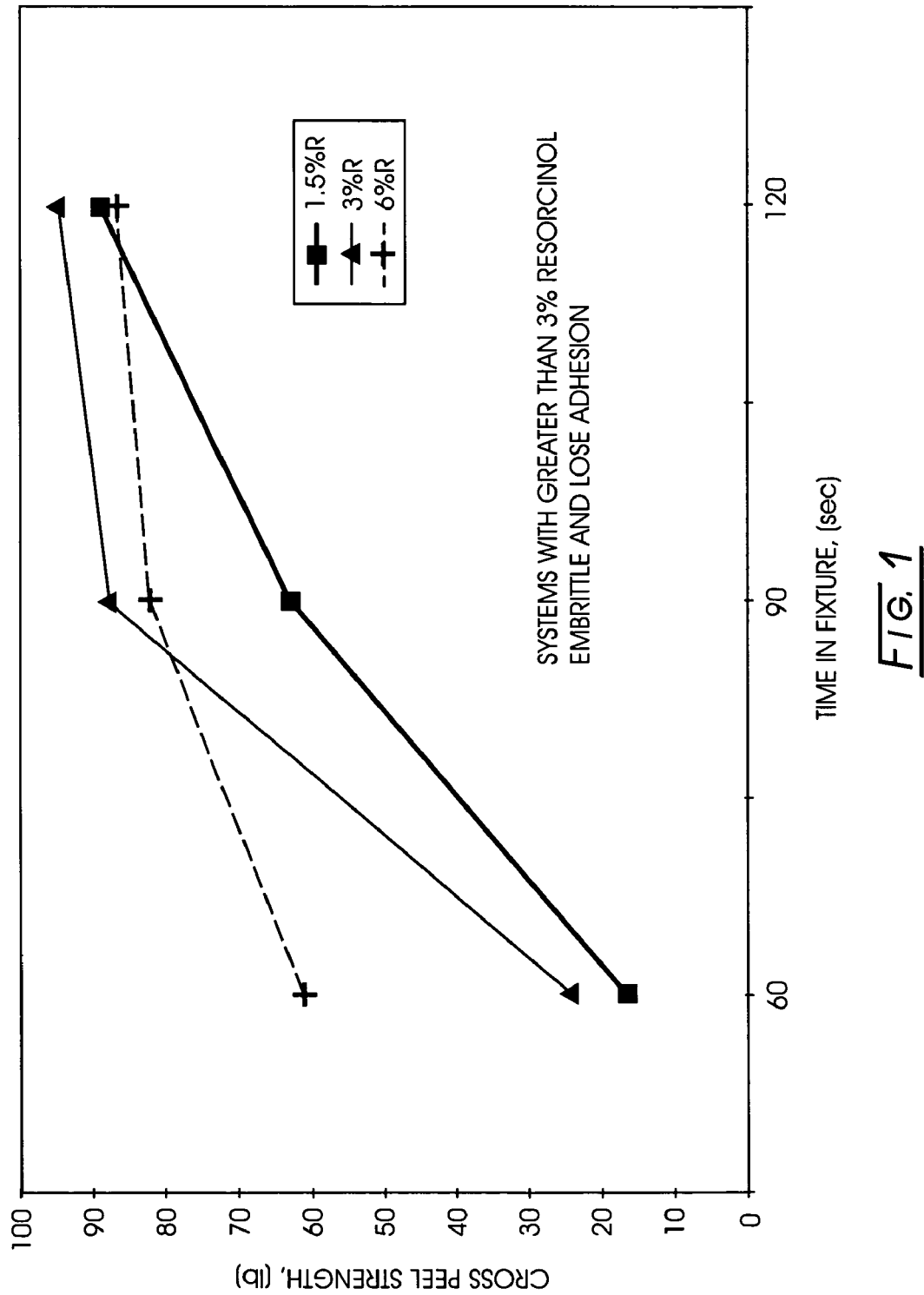
FIGS. 1-4 are plots of the data reported in the Examples.

The drawings will be described in further detail below.

DETAILED DESCRIPTION OF THE INVENTION

Initial work evaluated the catalytic power of dihydric phenols as reaction accelerators with very good results. Pre-dissolving the additives into part A or B at elevated temperature, a large number of polyfunctional amine-containing compounds were evaluated using cross peel as means for comparison. Cross peel involves overlaping a pair of one-by-three inch SMC coupons to form a cross with the adhesive between the overlap. The sample, then, is seated in a heated fixture for a preset time and peeled apart while still hot. This test yields a relative comparison of the adhesive strength versus time and, thus, the relative state of adhesive cure. These results also model the adhesives' behavior at the moment a production tool opens its clamp to release a hot bonded component. At concentrations greater than 3 weight-percent, the dihydric phenols were very efficient accelerators when matched with non-modified aliphatic amines. However, at this concentration the adhesive embrittled and failed with an unacceptable glassy pattern.

Research then shifted to other reaction accelerators, such as, short chain polyols. Gylcerin was observed to have a mild positive affect at 1 weight-percent loading that was reversed at higher concentrations under the conditions evaluated. A combination of dihydric phenol and glycerin was evaluated and surprisingly a synergistic acceleration was observed. It now was possible to achieve cross peel values equal to 6 weight-percent dihydric phenol using just 3 weight-percent in combination with 1 weight-percent glycerin (polyol). Quite unexpectedly, this reaction enhancement was obtained without the level of glassy embrittlement and loss of adhesion observed at higher levels of dihydric phenol and with a longer open time. The result is a two-part epoxy capable of generating a 60 second cure cycle at 127° C. with an approximately 17 minutes open time, low odor, and good adhesion to automotive grade SMC. The Chrysler MS-CC631 specification with additional Cataplasm testing at 1000 and 3000 hours have been completed with good results. System stability testing at 54° C. for 53 days was also completed with acceptable results.

The synergistic epoxy accelerator, then, is a combination of a polyol and a dihydric phenol. Suitable dihydric aromatic compounds contain from between about 6 and about 24 carbon atoms, more preferable from about 6 and about 18 carbon atoms. Suitable dihydric aromatic compounds include, for example, one or more of 3-hydroxybenzyl alcohol, 4-hydroxybenzyl alcohol, 1,3-dihydroxynaphthalene, 1,5-dihydroxynaphthalene, 1,7-dihydroxynaphthalene, and bisphenols having the formula:

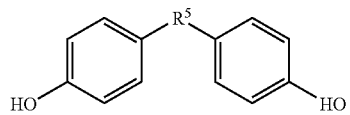

wherein $R^5$ is a bivalent radical containing 1 to 8 atoms of C, O, S and/or N, more preferable an alkylene or alkylidene group containing 1 to 8 carbon atoms and even more preferable an alkylene or alkylidene group containing 1 to 6 carbon atoms. Examples of suitable bisphenols include, for example, methylene bisphenol, isopropylidene bisphenol, butylidene bisphenol, octylidene bisphenol, bisphenol sulfide, bisphenol sulfone, bisphenol ether, bisphenol amine and the like.

Even more preferable are dihydric single aromatic ring molecules of the following general formula:

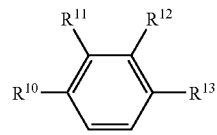

wherein R10 is hydroxyl, R11 is hydroxyl, hydrogen or alkyl, R12 is hydroxyl, hydrogen or alkyl and R13 is hydroxyl, hydrogen or alkyl. Examples of suitable dihydric single aromatic ring molecules include, for example, catechol, resorcinol, hydroquinone, methyl resorcinol, and the like. Appropriate amounts of dihydric phenol range from about 0.1 to about 25 percent based on weight of the epoxy resin side, and more preferred from about 0.01 to about 10 percent, and even more preferred from about 1 to about 5 weight percent.

Suitable aliphatic polyhydric alcohols, (polyols), are those containing from 2 to 15 carbon atoms and barring from two to ten hydroxyl functionality groups. Examples of acceptable polyhydric alcohols include one or more of ethylene glycol, 1,2-propylene glycol, 1,3-propylene glycol, glycerol, dipropylene glycol, tripropylene glycol, 2-methyl-1,3-propanediol, pentaerythritol, trimethylopropane, 1,4,6-octanetriol, butanediol, pentanediol, hexanediol, dodecanediol, octanediol, chloropentanediol, glycerol monoethyl ether, diethylene glycol, 2-ethylhexanediol, 1,4-cyclohexanediol, 1,2,6-hexanetriol, 1,3,5-hexanetriol, 1,3-bis-(2-hydroxyethoxy)propane and the like. Suitable concentrations of aliphatic polyhydric alcohols range from about 0.1 to about 9.9 percent based on weight of the epoxy resin side and more preferable from about 0.1 to about 3 percent and even more preferred from about 0.5 to about 1.5 weight percent.

Referring now to the epoxy resin, a variety of monomeric and polymeric compounds or mixtures of compounds having an epoxy equivalency equal to or greater than 1 (i.e., wherein the average number of epoxy groups per molecule is 1 or more) can be used in formulating the inventive adhesives. Epoxy compounds are well-known as the art cited above details and which is expressly incorporated herein by reference. Useful epoxy compounds include, for example, polyglycidyl ethers of polyhydric polyols, such as ethylene, glycol, triethylene glycol, 1,2-propylene glycol, 1,5-pentanediol, 1,2,6-hexanetriol, glycerol, and 2,2-bis(4-hydroxy cyclohexyl)propane; polyglycidyl ethers of aliphatic and aromatic polycarboxylic acids, such as, for example, oxalic acid, succinic acid, glutaric acid, terephthalic acid, 2,6-napthalene dicarboxylic acid, and dimerized linoleic acid; polyglycidyl ethers of polyphenols, such as, for example, bisphenol A, bisphenol F, 1,1-bis(4-hydroxy phenyl)ethane, 1,1-bis(4-hydroxy phenyl)isobutane, and 1,5-dihydroxy napthalene; modified epoxy resins with acrylate or urethane moieties; glycidylamine epoxy resins; and novolak resins; and the like and mixtures thereof.

The foregoing epoxy resins may be augmented with modified epoxy resins in the form of epoxy-rubber adducts. Such adducts are well known and include epoxy compounds reacted with liquid or solid butadiene-(meth)acrylonitrile copolymers having at least two groups which are reactive with epoxy groups, including, for example, carboxyl, hydroxyl, mercapto, and amino. Such functional elastomeric copolymers having functional groups are well-known articles of commerce and need not be discussed in greater detail herein.

Referring now to the hardener, such hardener or curing agent comprises various aliphatic polyamines, polyamidoamines, alicyclic polyamines, tertiary amines, and various mixtures thereof may be used. Examples of amine hardeners include, but are not limited to, ethylenediamine, diethylenetriamine, triethylenetetramine, tetraethylenepentamine, 2-methyl-1,5-pentanediamine, pentaethylenehexamine, hexamethylenediamine, trimethyl-1,6-hexanediamine, polyetherdiamine, diethylaminopropylamine, oleylamine, isophorone diamine, diethanolamine, triethanolamine, tris(dimethyl)aminoethylphenol, tris(dimethyl)aminomethyphenol, dimethylaminomethylphenol, m-xylenediamine, diaminodiphenyisulfone, bis(aminopropyl)piperazine, and N-aminoethylpiperazine. In addition, aliphatic polyamines, which are modified by condensation with tall oil fatty acids, may be used. Furthermore, Mannich bases and aromatic polyamines, such as xylenediamine, may be used as amine hardeners.

In order to obtain high flexibility, toughness and improved water stability, amidoamines or polyamides may be used. Amidoamines can contain flexible groups, in particular the dimerized linoleic acid backbone. These materials may be obtained from commercials sources, i.e., Versamid 140 (the reaction product of dimerized linoleic acid with aliphatic primary amines).

Optional ingredients in the adhesive composition include, for example, phosphine, polyamine, polyamidoamine, and polyamide catalysts and curing agents; particulate and reinforcing fillers and thixotropic agents, tinctorial pigments, opacifying pigments (e.g., $TiO_2$), and like conventional additives. Fillers are utilized in the adhesive to help maintain viscosity, improve sag resistance, and provide reinforcement to the final cured material, as well as reduce the final cost of the product. Useful fillers include, for example, Kevlar®, kaolin, talc, mica, bentone clay, calcium carbonate, any of the alkaline earth inorganic salts, metals such as powdered aluminum or iron, metal oxides such as ferric oxide or aluminum oxide, silica, ceramic beads such as those available under the trademark Zeeospheres from Zeelan Industries, Inc., or any other filler (and mixtures thereof) well-known to those skilled in the art of formulating adhesives. Filler particle size may vary from the nano to the micron range.

The disclosed adhesive is particularly well adapted for use on a variety of fiber-reinforced composites, including, for example sheet molding compound (SMC) substrates. Among the fiberglass reinforced polyester substrates useful herein are those provided by Ashland Performance Materials, Dublin, Ohio (Phase β, Phase δ, Phase ε), GenCorp, Marion, Ind. (GC-7113, GC-8002 and GC-7101 substrates), Rockwell International Corporation, Centralia, Ill. (RW 9468 Substrate), Budd Company, Madison Heights, Mich. (DSM 950 and DSM 951 Substrate) and Eagle Picher Plastics, Grabill, Ind. (EP SLI-213 Substrate), and the like. Car and truck body parts made of sheet molding compound (SMC) also are adhered using the fast cure structural urethane adhesives and can now be adhered using the disclosed two part epoxy adhesive.

The disclosed adhesive also can be used to join metal. Metals include, for example, hot dipped galvanized steel, electro galvanized steel, e-coat steel, cold rolled steel, bare aluminum, anodized aluminum, etched aluminum, magnesium, and the like.

The adhesive composition is formulated by simple blending, often under high temperature and shear conditions, of the ingredients. For SMC or metal uses, the adhesive composition preferably is applied robotically by extrusion through a follower plate or manually with a side by side cartridge, though it may be diluted in appropriate solvent, such as, for example, methylethylketone, and applied by conventional roller coating, both direct and indirect, spray application, dip application, side-by-side cartridge, or any application technique that is necessary, desirable, or convenient. No priming of the composite or metal substrate is required when using the inventive adhesive. The parts then are joined under pressure at ambient temperature or, optionally, elevated temperatures (i.e., greater than 82° C.) to facilitate cure.

While the invention has been described and illustrated in connection with certain preferred embodiments thereof, it will be apparent to those skilled in the art that the invention is not limited thereto. Accordingly, it is intended that the appended claims cover all modifications, which are within the spirit and scope of this invention. All references cited herein are expressly incorporated herein by reference.

The following examples show how the invention has been practiced, but should not be construed as limiting. In this application, all percentages and proportions are by weight and all units are in the metric system, unless otherwise expressly indicated.

EXAMPLES

List of Raw Materials

Epoxy Resin Side Components Description
Epon 834 . . . Epoxy Resin Diglycidyl ether of bisphenol A, EEW=260, (higher molecular weight epoxy than standard), available from Hexion Specialty Chemical.
Epon 828 . . . Epoxy Resin Diglycidyl ether of bisphenol A, EEW=189, (standard epoxy resin), available from Hexion Specialty Chemical.
Epon 58006 . . . ABA Block copolymer with B=carboxyl terminated butadiene nitrile rubber, CTBN, (acrylonitrile content=18%, Tg=−52C), and A=Epon 828 epoxy resin, available from Hexion Specialty Chemical.
Epon 58042 . . . ABA Block copolymer with B=carboxyl terminated butadiene nitrile rubber, CTBN, (acrylonitrile content 26%, Tg=−39C), and A=digylcidyl ether of cyclohexane dimethanol, available from Hexion Specialty Chemical.
Heloxy 505 . . . Polyglycidyl ether of castor oil, available from Hexion Specialty Chemical.
Mistron RSC Talc . . . Hydrous magnesium silicate, available from Cyprus Industrial Minerals.
Winofil SPM . . . Fatty acid coated precipitated calcium carbonate, available from Zeneca Resins.
Cab-O-Sil TS-720 . . . Silicone oil treated synthetic hydrophobic silicon dioxide, "fumed silica", available from Cabot Corporation.
Glycerin . . . Short chain polyol, available from Aldrich.
Catechol . . . Dihydric phenol, 1,2-dihyroxybenzene, mp=105° C., available from Aldrich.
Resorcinol . . . Dihydric phenol, 1,3-dihydroxybenzene, mp=111° C., available from Aldrich.

Amine Side Components Description

Versamid 140 . . . Polyamide resin based on dimerized fatty acid and polyamines, AHEW=97, available from Henkel.

ATBNX42 . . . 2-methylpentamethylene diamine terminated butadiene acrylonitrile liquid rubber, (acrylonitrile content=18%, Tg=−59C, AHEW=225), available from Emerald L.C.C.

AEP . . . Aminoethyl-piperazine, unmodified aliphatic amine, AHEW=43, available from Air Products.

TETA . . . Triethylenetetramine, unmodified aliphatic amine, AHEW=27, available from Air Products.

DEH 52 . . . Diethylenetriamine adduct with liquid epoxy, AHEW=45, available from Dow Chemical.

D230 . . . Polyoxypropylene amine, AHEW=60, available from Huntsman.

Stan-tone 29746 . . . Carbon black pigment dispersion available from Polyone.

Substrate

The sheet molding compound, (SMC), used in this investigation was primarily phase delta obtained from Ashland Special Chemical, Dublin, Ohio.

Alternate SMC used in this study was obtained from Menzolit in Germany and designated as 7226.

The technology is adaptable to sundry other substrates such as metal, thermoplastic, and thermoset materials.

General Definitions

Part A . . . Refers to the epoxy resin side

Part B . . . Refers to the amine based curative side

FT . . . 100% Fiber Tear in substrate

Cataplasma Cycle . . . Wrap lap shear coupons in cotton batting and place in zip lock bag, add 10 times cotton wt. of DI water, remove air and seal, then place in oven at 70° C. for 7 days; remove samples from cotton and place at −20° C. for 2 hrs, then 2 hrs at 22° C. and test.

VDA Cycle . . . Each cycle consists of 24 hrs in salt spray, ASTM B117, followed by 4 days each consisting of 8 hrs at 38° C./100% relative humidity (RH) and 16 hours at 22° C., followed by 68 hours at 38° C./100% RH. When 10 cycles are complete the samples are tested at 22° C.

Condition Cycle . . . Each cycle consists of 24 hrs at 79° C. then 24 hrs at 38° C./100% relative humidity, followed by 24 hrs at −29° C. When the numbers of cycles are complete the test is run at 22° C.

Adhesive Compounding

The adhesive formulations were prepared by simple blending at elevated temperature. The individual mixtures were prepared in a 2000 ml resin kettle capped with a three-neck lid. One neck was fitted with a high-shear mixing blade; the other two acted as inlet and outlet for vacuum and argon purge. The part A or epoxy side was prepared by adding the appropriate epoxy resins and epoxy terminated rubber and heating to 88° C. under full vacuum of 30 inches Hg and moderate mixing to remove all gas from the system. If used, the dihydric phenol was added and the temperature raised above its individual melting point under vacuum and low shear mixing. Next while maintaining temperature, the talc and calcium carbonate fillers were added and mixed with high shear under full vacuum for 30 minutes. The fumed silica then was incorporated with high shear and vacuum until a uniform, smooth, glossy mixture was obtained. Finally, if used, the glycerin was added last and again mixed under high shear and vacuum for 30 minutes. The final product was poured into dry glass jars and purged with argon.

For the part B or amine side, the resins were added to a resin kettle and heated to 60° C. and fully degassed under vacuum and low shear mixing before further additions were made. If used, the dihydric phenolic compounds also may be added to the amine side at this stage by raising the temperature above its respective melting point and mixing in. The calcium carbonate then may be added with high shear mixing to fully de-agglomerate the powder prior to adding the fumed silica. Finally, the system is mixed under full vacuum until a uniform, smooth, glossy appearance is obtained. Product was then stored in glass jars until use.

Mixing A and B Components

One laboratory method to prepare the mixture is to measure the proper amounts of A and B components into a 200 ml cup and mix for two minutes at 2500 RPM in a Speedmixer™ DAC 400 FVZ mix system. Alternatively and more preferred is to load the A and B components individually and separately into side by side cartridges and pump through a static mix tube to achieve complete mixing. The product then is applied from the mix tube or cup directly onto the appropriate substrate.

Construction of Test Samples

The adhesive is applied directly from the static mix tube or mix cup onto side one of the appropriate substrate. A small amount of 30 mil glass beads are then sprinkled onto the adhesive before mating the second side with enough pressure to squeeze out excess adhesive and ensure the beads touch both sides of the substrate.

Cross Peel Test. The cross peel test involves overlaping a pair of one inch by three inch coupons to form a cross with the adhesive between the overlap. The sample is then seated in a two sided pre-heated fixture for a specific time and then pulled apart while still hot. This test yields a relative comparison of the adhesive strength vs. time and thus the relative state of adhesive cure.

Lap Shear Test. The lap shear test requires overlapping the last one inch of a pair of four by one inch coupons to create a seven inch long sample with adhesive and 30 mil glass spacer beads between the overlap. This sample then is placed between a two sided preheated fixture for a specific time and then removed and cooled to 22° C. The sample then may be tested or subjected to a post bake process of 30 minutes at 149° C. and then may be followed by a post bake of 30 minutes at 204° C. to model a customers' requirements. The sample is then returned to 22° C. at which time it may be tested or further heated or cooled and tested at alternate temperatures to model practical in use applications. Typical evaluation temperatures include −34° C., −30° C., 22° C., 82° C., and 121° C. The lap shear test is conducted according to ASTM D3163 with a crosshead speed of 1.27 cm per minute.

Side Impact Test. The side impact test is performed on a lap shear sample by mounting it horizontally in a fixture and impacting it with a pedulum fitted with a weighted hammer head as called out in the General Motors GM9751P adhesive testing specification.

Open Time Test. The open time is determined by extruding out a one-half inch wide and tall bead of freshly mixed adhesive approximately two feet long at 22° C. A timer is started as soon as the material is mixed. A small wooden stick is used to tap an untapped area of the bead until which time the stick no longer pulls wet adhesive from the surface.

Results

Initial work evaluated the catalytic power of dihydric phenols as reaction accelerators with very good results. Pre-dissolving the additives into part A or B at elevated temperature, a large number of polyfunctional amine containing compounds were evaluated using cross peel as means for comparison. Cross peel involves overlaping a pair of one by three inch SMC coupons to form a cross with the adhesive between the overlap. The sample then is seated in a two-sided fixture preheated to 127° C. for a preset time, 60 seconds, and pulled apart while still hot. This test yields a relative comparison of the adhesive strength versus time and, thus, the relative state of adhesive cure. Longer cure times are typically listed with the data, such as 90 and 120 seconds, but the true advantage of this invention is maximizing the strength with only a 60-second heat cure. At concentrations greater than 3 percent the dihydric phenols were very efficient accelerators when matched with non-modified aliphatic amines. However, at this concentration the adhesive became brittle, failing with an unacceptable glassy pattern.

In the following examples supporting documentation is reviewed:

MB6608-86-1, 89-2, 4: Resorcinol content was varied from 1.5%-6% in a constant formula using amino ethyl piperazine as curative. Results show an incremental improvement in cross peel strength after 60 seconds at 127° C. from 16 to 24 to 61 lbs. Observations from the sample failures showed a sharp glassy pattern in the adhesive above 3% resorcinol, (catastrophic web like failure similar to that of a plate of glass fracturing), see formulas in Table 1 below, data in Table 2 below, and FIG. 1:

TABLE 1

| Component | 6608-86-1 | 89-2 | 89-4 |
|---|---|---|---|
| Epoxy Side | | | |
| Epoxy 828 | 48.32 | 48.32 | 48.32 |
| Epon 58006 | 9.87 | 9.87 | 9.87 |
| Heloxy 505 | 3.93 | 3.93 | 3.93 |
| Resorcinol | 6 | 3 | 1.5 |
| Catechol | 0 | 0 | 0 |
| Mistron RSC Talc | 14.79 | 14.79 | 14.79 |
| Winnofil SPM | 20.34 | 20.34 | 20.34 |
| TS-720 | 2.75 | 2.75 | 2.75 |
| Glycerin | 0 | 0 | 0 |
| Amine Side | | | |
| V140 | 14.49 | 14.49 | 14.49 |
| ATBNX42 | 9.86 | 9.86 | 9.86 |
| AEP | 12.75 | 12.75 | 12.75 |
| TETA | 0 | 0 | 0 |
| DEH 52 | 0 | 0 | 0 |
| D230 | 0 | 0 | 0 |
| Mistron RSC Talc | 0 | 0 | 0 |
| TS-720 | 0 | 0 | 0 |

TABLE 2

(Results in lbs)
Cross Peel Result, 9420 SMC

| 260 F. time, (sec) | 1.5% R 89-4 | 3% R 89-2 | 6% R 86-1 |
|---|---|---|---|
| 60 | 16 | 24 | 61 |
| 90 | 63 | 88 | 82 |
| 120 | 89 | 95 | 87 |

Figure 2:
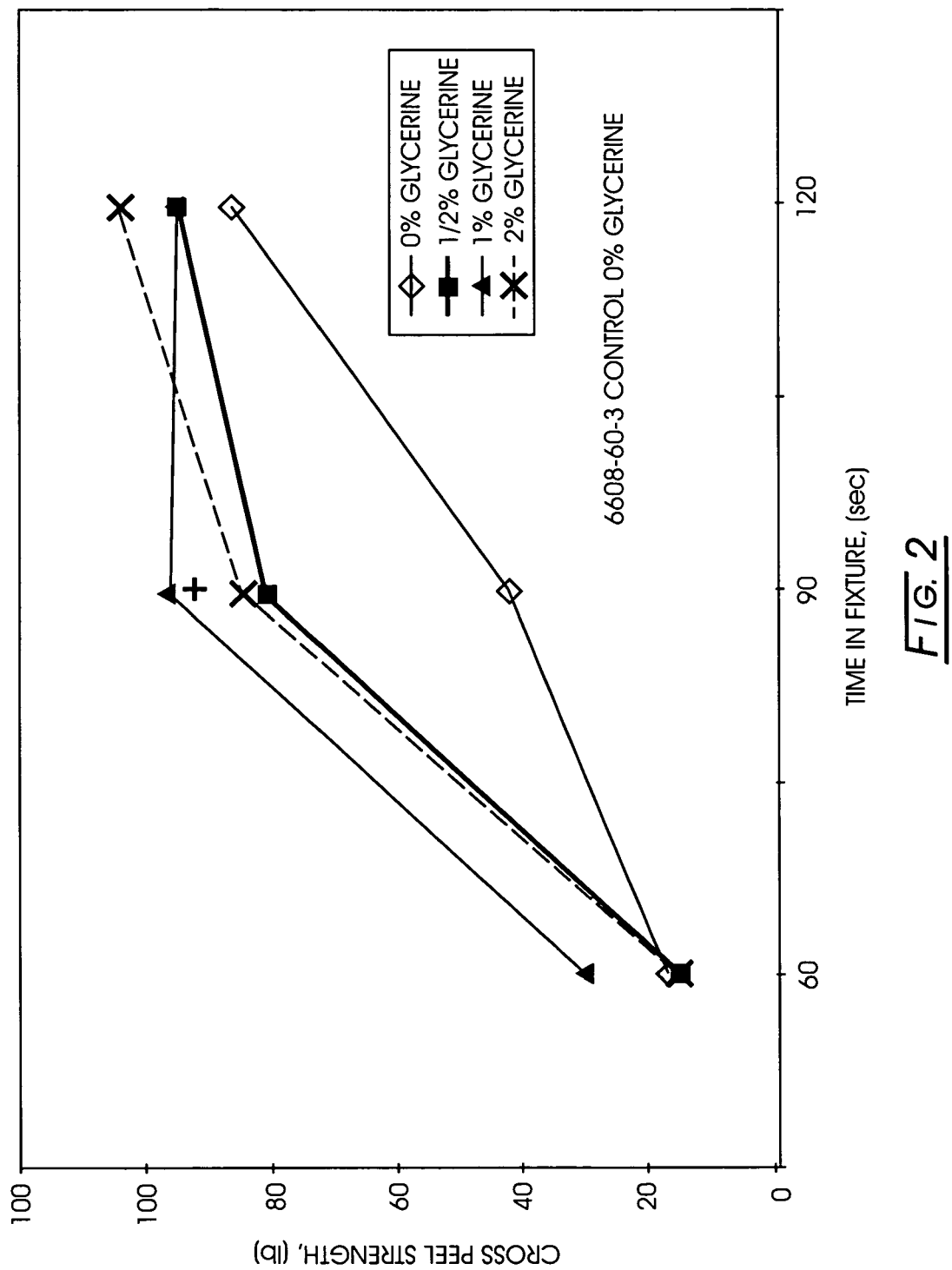

MB6608-60-3, 117-L, H, I: The concentration of glycerin was varied from 0-2% using triethylenetetramine, TETA, as curative and showed a mild improvement at 1% after a 60 second cure at 127° C. that was reversed when glycerin was increased to 2%, see formulations in Table 3, cross peel data in Table 4, and FIG. 2.

TABLE 3

| Component | 60-3 | 117L | 117H | 117I |
|---|---|---|---|---|
| Epoxy Side | | | | |
| Epoxy 828 | 48.32 | 48.32 | 48.32 | 48.32 |
| Epon 58006 | 9.86 | 9.86 | 9.86 | 9.86 |
| Heloxy 505 | 3.94 | 3.94 | 3.94 | 3.94 |
| Resorcinol | 0 | 0 | 0 | 0 |
| Catechol | 0 | 0 | 0 | 0 |
| Mistron RSC Talc | 14.79 | 14.79 | 14.79 | 14.79 |
| Winnofil SPM | 20.34 | 20.34 | 20.34 | 20.34 |
| TS-720 | 2.75 | 2.75 | 2.75 | 2.75 |
| Glycerin | 0 | 0.5 | 1 | 2 |
| Amine Side | | | | |
| V140 | 16.86 | 16.48 | 16.55 | 16.71 |
| ATBNX42 | 12.21 | 11.91 | 11.98 | 12.1 |
| AEP | 0 | 0 | 0 | 0 |
| TETA | 7.56 | 7.38 | 7.41 | 7.49 |
| DEH 52 | 0 | 0 | 0 | 0 |
| D230 | 0 | 0 | 0 | 0 |
| Mistron RSC Talc | 0 | 0 | 0 | 0 |
| TS-720 | 0 | 0 | 0 | 0 |

TABLE 4

(Results in lbs)
Cross Peel Results, 9420 SMC

| 260 F. time, (sec) | 0% Glycerin 60-3 | ½% Glycerin 117L | 1% Glycerin 117H | 2% Glycerin 117I |
|---|---|---|---|---|
| 60 | 17 | 15 | 31 | 15 |
| 90 | 42 | 81 | 97 | 85 |
| 120 | 87 | 95 | 96 | 104 |

Figure 3:
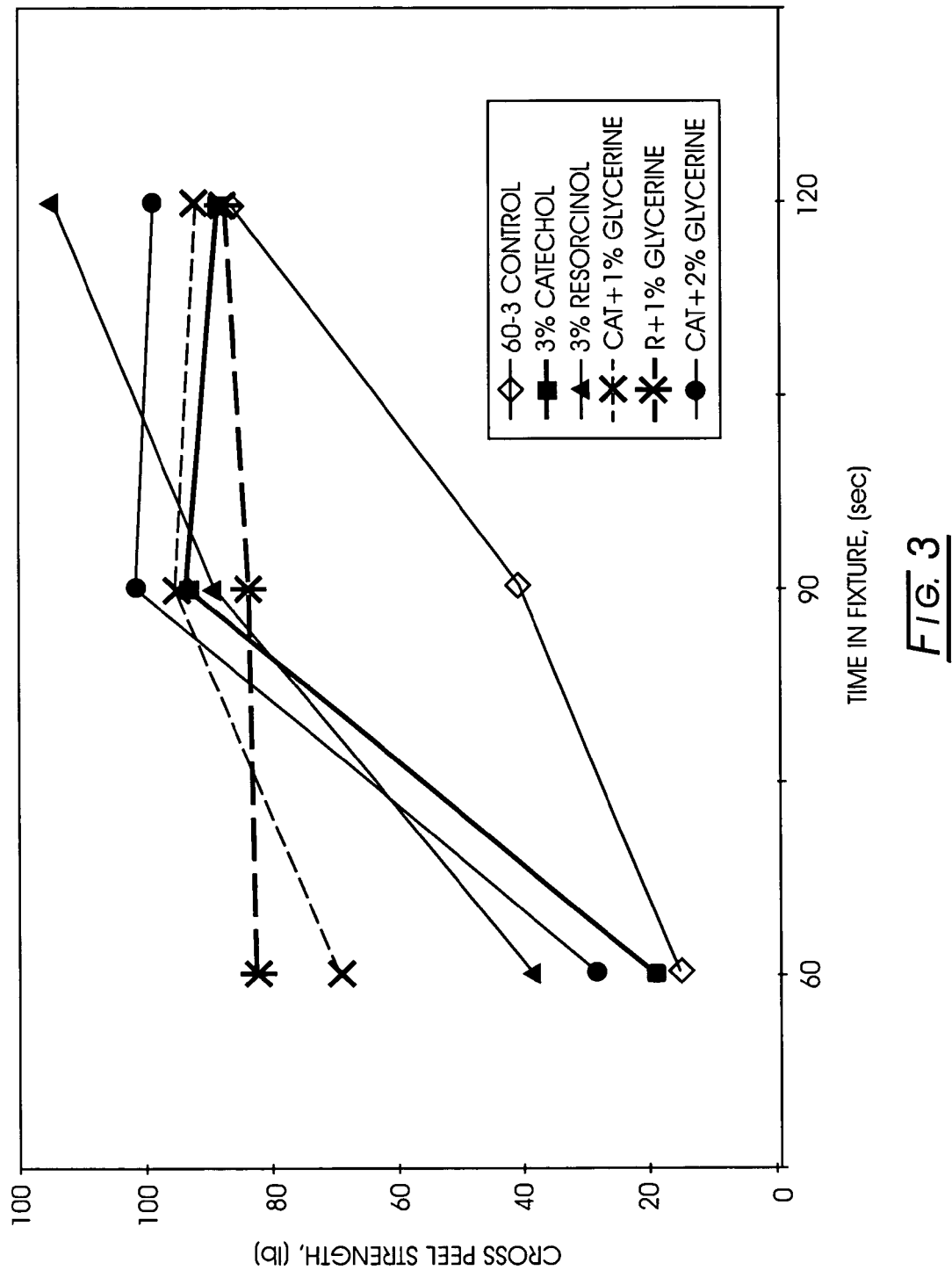

MB6608-60-3, 115Q, T, 116E, G, 117K: Using TETA, this series compares the control without dihydric phenol, or glycerin with systems containing just catechol or resorcinol and to systems containing either phenol, (catechol or resorcinol), and 1% glycerin. The cross peel data at 60 seconds shows the control at 17 lbs increases moderately with 3% catechol, 21 lbs or resorcinol at 40 lbs, and jumps considerably with catechol and glycerin 70 lbs and resorcinol and 1% glycerin 83 lbs. Also shown is the affect of overdosing glycerin to 2% with 3% catechol where the 60 second cross peel drops to 30 lbs, see formulas in Table 5, data in Table 6 below and FIG. 3.

TABLE 5

| Component | 60-3 | 115Q | 115T | 116E | 117K | 116G |
|---|---|---|---|---|---|---|
| Epoxy Side | | | | | | |
| Epoxy 828 | 48.32 | 48.32 | 48.32 | 48.32 | 48.32 | 48.32 |
| Epon 58006 | 9.86 | 9.86 | 9.86 | 9.86 | 9.86 | 9.86 |
| Heloxy 505 | 3.94 | 3.94 | 3.94 | 3.94 | 3.94 | 3.94 |
| Resorcinol | 0 | 0 | 3 | 0 | 3 | 0 |
| Catechol | 0 | 3 | 0 | 3 | 0 | 3 |
| Mistron RSC Talc | 14.79 | 14.79 | 14.79 | 14.79 | 14.79 | 14.79 |
| Winnofil SPM | 20.34 | 20.34 | 20.34 | 20.34 | 20.34 | 20.34 |
| TS-720 | 2.75 | 2.75 | 2.75 | 2.75 | 2.75 | 2.75 |
| Glycerin | 0 | 0 | 0 | 1 | 1 | 2 |

TABLE 5-continued

| Component | 60-3 | 115Q | 115T | 116E | 117K | 116G |
|---|---|---|---|---|---|---|
| Amine Side | | | | | | |
| V140 | 16.86 | 16.88 | 16.88 | 17.04 | 17.04 | 17.2 |
| ATBNX42 | 12.21 | 12.22 | 12.22 | 12.34 | 12.34 | 12.46 |
| AEP | 0 | 0 | 0 | 0 | 0 | 0 |
| TETA | 7.56 | 7.56 | 7.56 | 7.63 | 7.63 | 7.71 |
| DEH 52 | 0 | 0 | 0 | 0 | 0 | 0 |
| D230 | 0 | 0 | 0 | 0 | 0 | 0 |
| Mistron RSC Talc | 0 | 0 | 0 | 0 | 0 | 0 |
| TS-720 | 0 | 0 | 0 | 0 | 0 | 0 |

TABLE 6

(Results in lbs)
Cross Peel Results, 9420 SMC, results in (lbs)

| 260 F. time, (sec) | No Additives 60-3 Control | 3% Catechol 115Q | 3% Resorcinol 115T | 3% Cat + 1% Glycerine 116E | 3% R + 1% Glycerine 116K | 3% Cat + 20% Glycerine 116G |
|---|---|---|---|---|---|---|
| 60 | 17 | 21 | 40 | 70 | 83 | 30 |
| 90 | 42 | 94 | 90 | 95 | 84 | 102 |
| 120 | 87 | 89 | 115 | 92 | 88 | 99 |

The above-tabulated data supports the concept of a synergistic response in cross peel strength when either catechol or resorcinol and low levels of glycerin are present with an aliphatic amine. The glycerin on its own shows only a mild improvement that does not increase with concentrations over about 1%. The dihydric phenols are capable of providing greater response with increasing concentration but become brittle when the concentrations are over 3%. By combining both 3% dihydric phenol and 1% glycerin the cross peel response is enhanced without the characteristic brittleness found at higher levels of phenolic additive.

Figure 4:
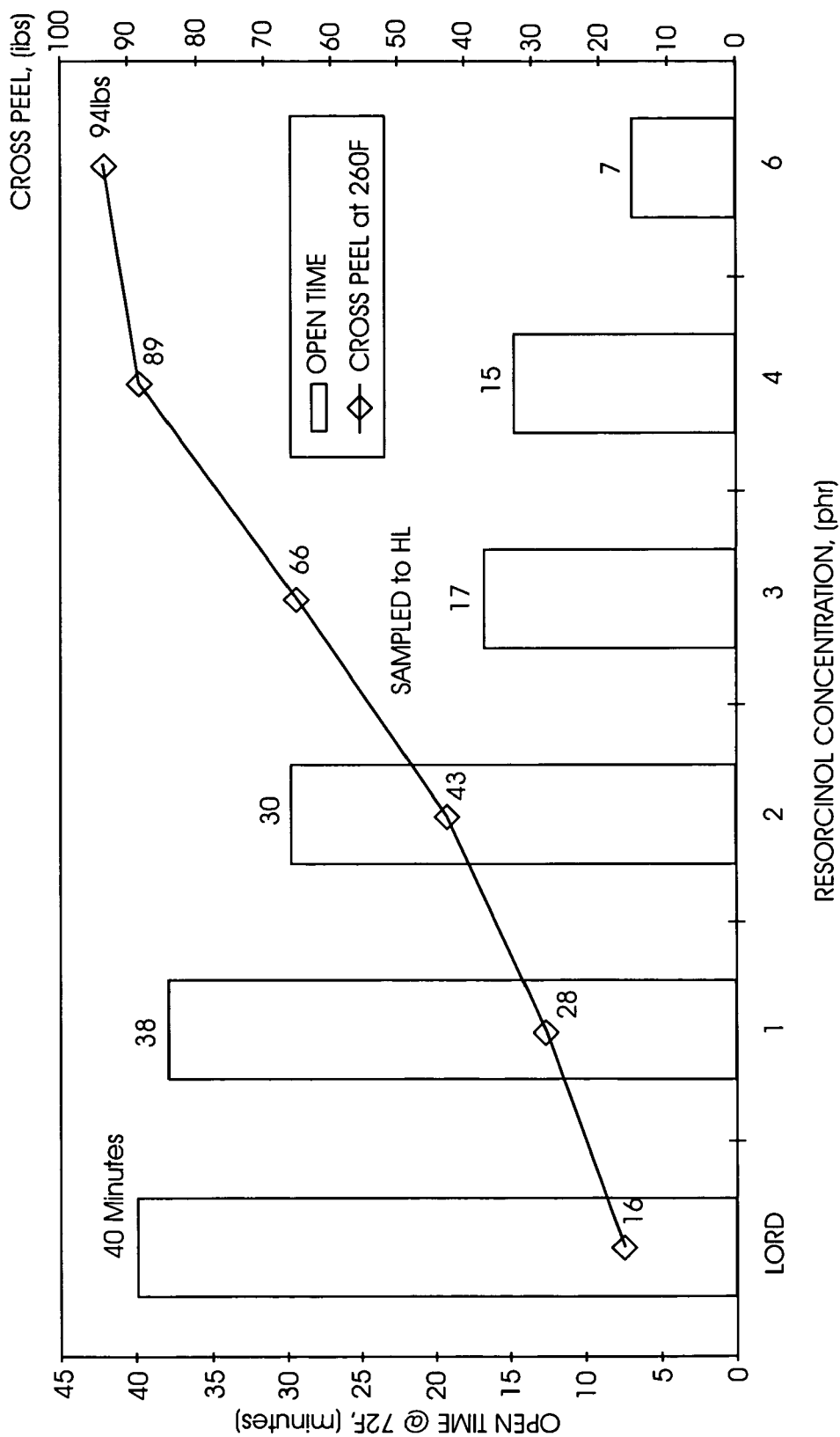

MB6608-174: This series shows the affect of increasing resorcinol concentration with constant 1% glycerin on the 60 second cross peel response at 127° C. and open time at 22° C. using an alternate aliphatic amine, aminoethyl piperazine. There is an inverse relationship showing open time decreasing as the cross peel increases with increasing resorcinol concentration, see formulas in Table 7, data in Table 8 below, and FIG. 4.

TABLE 7

| Component | 174-1F | 174-1 | 174-2 | 174-3 | 174-4 |
|---|---|---|---|---|---|
| Epoxy Side | | | | | |
| Epoxy 828 | 48.32 | 48.32 | 48.32 | 48.32 | 48.32 |
| Epon 58006 | 9.87 | 9.87 | 9.87 | 9.87 | 9.87 |
| Heloxy 505 | 3.93 | 3.93 | 3.93 | 3.93 | 3.93 |
| Resorcinol | 1 | 2 | 3 | 4 | 6 |
| Catechol | 0 | 0 | 0 | 0 | 0 |
| Mistron RSC Talc | 14.79 | 14.79 | 14.79 | 14.79 | 14.79 |
| Winnofil SPM | 20.34 | 20.34 | 20.34 | 20.34 | 20.34 |
| TS-720 | 2.75 | 2.75 | 2.75 | 2.75 | 2.75 |
| Glycerin | 1 | 1 | 1 | 1 | 1 |

TABLE 7-continued

| Component | 174-1F | 174-1 | 174-2 | 174-3 | 174-4 |
|---|---|---|---|---|---|
| Amine Side | | | | | |
| V140 | 4.58 | 4.62 | 4.67 | 4.71 | 4.80 |
| ATBNX42 | 9.75 | 9.85 | 9.94 | 10.04 | 10.23 |
| AEP | 0 | 0 | 0.00 | 0.00 | 0.00 |
| TETA | 0 | 0 | 0.00 | 0.00 | 0.00 |
| DEH 52 | 13.18 | 13.31 | 13.44 | 13.57 | 13.82 |
| D230 | 2.01 | 2.03 | 2.05 | 2.07 | 2.11 |
| Mistron RSC Talc | 15.64 | 15.79 | 15.94 | 16.10 | 16.40 |
| TS-720 | 1.14 | 1.15 | 1.16 | 1.18 | 1.20 |

TABLE 8

(Results in lbs)
Open Time Vs Resorcinol Concentration, Constant
1% Glycerin, 6608-174 Series 1, 2, 3, 4, Tested at 127 C.

| Resorcinol Concentration | Open Time Minutes at 72 F. | 60 Sec Cross Peel (lbs) |
|---|---|---|
| 1 | 38 | 28 |
| 2 | 30 | 43 |
| 3 | 17 | 66 |
| 4 | 15 | 89 |
| 6 | 7 | 94 |

Aging Study

MB6608-180A: System stability was evaluated through accelerated aging by filling a 16 oz glass jar and storing at 54° C. After nine days the epoxy-dihydric phenol mixture was observed to increase in viscosity and after 36 days it was no longer pourable (see formula in Table 9 below). Background work was performed and the dihydric phenol was moved to the amine side (see MB7122-6-1 in Table 9). After fifty three days at 54° C. the material still poured and dripped. This same aged batch was then stored at 22° C. for an additional 480 days, after which it was still fluid and pourable. Cross peel data also was generated with MB7122-6-1 before and after aging. The results shown in Table 10 below showed no loss in reactivity after 30 days and only a slight loss after 53 days confirming a stable system.

A black pigment master batch prepared by ink milling carbon black into the amine side was added to create a visual check of mixing effectiveness when blended with the nutral color epoxy resin side, (see MB6608-31B in Table 9). Cross peel data also was generated with MB7122-6-1 before and after aging.

TABLE 9

| Component | 6608-180A Wt-% | 7122-6-1 Wt-% | 7122-31B Wt-% | 6608-116E Wt-% |
|---|---|---|---|---|
| Epoxy Side | | | | |
| Epoxy 828 | 48.32 | 48.32 | 48.32 | 48.32 |
| Epon 58006 | 9.86 | 9.86 | 9.86 | 9.86 |
| Heloxy 505 | 3.94 | 3.94 | 3.94 | 3.94 |
| Resorcinol | 3 | 0 | 0 | 0 |
| Catechol | 0 | 0 | 0 | 3 |
| Mistron RSC Talc | 14.79 | 14.79 | 14.79 | 14.79 |
| Winnofil SPM | 20.34 | 20.34 | 20.34 | 20.34 |
| TS-720 | 2.75 | 2.75 | 2.75 | 2.75 |
| Glycerin | 1 | 1 | 1 | 1 |
| Amine Side | | | | |
| V140 | 17.04 | 11.97 | 11.08 | 17.04 |
| ATBNX42 | 12.34 | 11.97 | 11.08 | 13.34 |
| TETA | 7.63 | 7.77 | 7.02 | 7.63 |
| Catechol | 0 | 3.00 | 2.77 | 0 |
| Carbon Black | 0 | 0 | 0.28 | 0 |
| Winnofil SPM | 0 | 2.4 | 1.96 | 0 |
| TS-720 | 0 | 1.2 | 1.28 | 0 |

TABLE 10

7122-6-1 127 C. Cross Peel Before and After Aging at 54 C., (lbs)

| Time, (sec) | Non-Aged | Aged 30 Days | Aged 53 Days |
|---|---|---|---|
| 60 | 60 | 57 | 63 |
| 90 | 90 | 96 | 78 |
| 120 | 95 | 92 | 97 |

A cross comparison was made between systems with dihydric phenol in either the epoxy resin side or the amine curative component, see formulas 7122-6-1, and 6608-116E above in Table 9. The cross peel results at 127° C. shown below in Table 11 reveal a good comparison irrespective of which side contains the dihydric phenol. It may be stated based on the greater stability obtained with the dihydric phenol in the curative side this is the more preferred method; however, either side may be used.

TABLE 11

Cross Peel Comparison of Dihydric Phenol in Part A or B

| Time, (sec) | 6608-116E | 7122-6-1 |
|---|---|---|
| 60 | 70 | 60 |
| 90 | 101 | 90 |
| 120 | 83 | 95 |

Comparison to Commercial Adhesives

Comparison of the new technology, 116E, was made to several commercial adhesives known in the market: PLIO-GRI®-5000, 5300, 5400, 5500, and Panel Bonder 60 (Ashland Inc., Dublin, Ohio) and a competitive epoxy containing p-chlorophenol, all two part epoxy adhesives. The relative cross peel data is shown in Table 12 below. This data clearly demonstrates the superiority of the strength build vs. time of this new technology.

TABLE 12

| | 127 C. Cross Peel, Tested Hot, (lbs) | | | | | | p-Chlorophenol |
|---|---|---|---|---|---|---|---|
| Time, (sec) | PG5000 | PG5300 | PG5400 | PG5500 | Panel 60 | EXP-116E | Competitor |
| 60 | 15 | 15 | 16 | 10 | 3 | 70 | 16 |
| 90 | 15 | 34 | 30 | 10 | 33 | 83 | 57 |
| 120 | 20 | 45 | 70 | 12 | 48 | 85 | 80 |

Low Odor

Several different technologies exist for enhancing the reactivity of one and two component epoxy adhesives such as, for example, addition of acrylic ester monomers to the epoxy component, use of accelerated mercaptan curing agents, and addition of chlorophenol. The distinct disadvantage of these technologies is the associated acrylic, skunky or phenolic odor emited when the adhesive is being applied. In addition, for the case of p-chlorophenol certain transportation companies have set forth new edicts to eliminate all chlorinated compounds from their facilities.

Physical Testing of Adhesive Bonded Composite

The structural integrity of the MB6608-174-2 adhesive, formula in Table 7 above, was evaluated by bonding ⅛ inch thick Menzolit 7226 sheet molding compound, SMC, using a standard one inch overlap and 30 mil bond thickness. The panels were cured using an existing automotive process including 10 minutes at 121° C. followed by a simulated paint bake of 30 minutes at 121° C. The results are in Table 13 shown below.

TABLE 13

| | Durability Testing Test at 22 C. | Test at 79 C. | Test at 93 C. | SMC from Menzolit 7226 Test at 107 C. | 250 hrs at 79 C. Tested at 22 C. | Average of 10 Samples 250 hrs at 38 C./100% RH Tested at 22 C. |
|---|---|---|---|---|---|---|
| Load | 294 psi | 310 psi | 207 psi | 185 psi | 310 psi | 242 psi |
| Failure Pattern | FT | FT | FT | FT | FT | FT |

| | 14 Days of Cataplasma Test at 22 C. | 10 VDA cycles | 250 hrs in Salt Spray, Test at 22 C. | 10 Condition Cycles | 1000 hrs at 38 C./100% RH Tested at 22 C. |
|---|---|---|---|---|---|
| Load | 327 psi | 198 psi | 254 psi | 281 psi | 232 psi |
| Failure Pattern | FT | FT | FT | FT | FT |

FT = Fiber Tear

The results above are all displayed the requisite 100 percent fiber tear failure patterns as defined in the automotive industry. The tests results show excellent performance in both the hot-wet strengths and the long-term durability as defined by the cyclic tests.

While the invention has been described with reference to various embodiments, those skilled in the art will understand that various changes may be made and equivalents may be substituted for elements thereof without departing from the scope and essence of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. In this application all units are in the metric system and all amounts and percentages are by weight, unless otherwise expressly indicated. Also, all citations referred herein are expressly incorporated herein by reference.

I claim:

1. In an epoxy adhesive composition of an epoxy resin and an amine hardener, the improvement for enhancing reaction rate and adhesion to SMC substrates, which comprises: a synergistic accelerator comprising about 0.1% to about 3% based on weight of the epoxy resin of an aliphatic polyhydric polyol containing from about 2 to about 15 carbon atoms and bearing from about 2 to about 10 hydroxyl functionality groups, and an effective amount of an aromatic dihydric phenol having between about 6 and about 24 carbon atoms wherein the amine hardener is selected from the group consisting of an aliphatic polyamine modified by condensation with a tall oil fatty acid, a Mannich base, an aromatic polyamine, an amidoamine and a polyamide.

2. The epoxy adhesive composition of claim 1, wherein said dihydric phenol has between from about 6 and about 18 carbon atoms.

3. The epoxy adhesive composition of claim 1, wherein said dihydric phenol is one or more of catechol, resorcinol, 3-hydroxybenzyl alcohol, 4-hydroxybenzyl alcohol, 1,3-dihydroxynaphthalene, 1,5-dihydroxynaphthalene, 1,7-dihydroxynaphthalene, bisphenols having the formula:

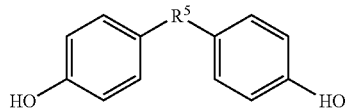

wherein $R^5$ is a bivalent radical containing 1 to 8 atoms of one or more of C, O, S or N.

4. The epoxy adhesive composition of claim 3, wherein $R^5$ is an alkylene or alkylidene group containing between 1 and 8 carbon atoms.

5. The epoxy adhesive composition of claim 4, wherein $R^5$ is an alkylene or alkylidene group containing between 1 and 6 carbon atoms.

6. The epoxy adhesive composition of claim 3, wherein said bisphenol is one or more of methylene bisphenol, isopropylidene bisphenol, butylidene bisphenol, octylidene bisphenol, bisphenol sulfide, bisphenol sulfone, bisphenol ether, or bisphenol amine.

7. The epoxy adhesive of claim 1, wherein said dihydric phenol is a single aromatic ring molecule of the following general formula:

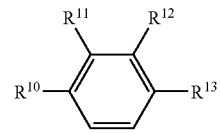

wherein, $R^{10}$ is hydroxyl, $R^{11}$ is hydroxyl, hydrogen or alkyl, $R^{12}$ is hydroxyl, hydrogen or alkyl, and $R^{13}$ is hydroxyl, hydrogen or alkyl.

8. The epoxy adhesive composition of claim 7, wherein said dihydric phenol is one or more of catechol, resorcinol, hydroquinone, or methyl resorcinol.

9. The epoxy adhesive composition of claim 1, wherein said dihydric phenol ranges from between about 0.1 to about 25 percent based on weight of the epoxy resin.

10. The epoxy adhesive composition of claim 9, wherein said dihydric phenol ranges from between about 0.1 to about 10 percent.

11. The epoxy adhesive composition of claim 10, wherein said dihydric phenol ranges from between about 1 to about 5 percent.

12. The epoxy adhesive composition of claim 1, wherein said polyol is one or more of ethylene glycol, 1,2-propylene glycol, 1,3-propylene glycol, glycerol, dipropylene glycol, tripropylene glycol, 2-methyl-1,3-propanediol, pentaerythritol, trimethylopropane, 1,4,6-octanetriol, butanediol, pentanediol, hexanediol, dodecanediol, octanediol, chloropentanediol, glycerol monoethyl ether, diethylene glycol, 2-ethylhexanediol, 1,4-cyclohexanediol, 1,2,6-hexanetriol, 1,3,5-hexanetriol, or 1,3-bis-(2-hydroxyethoxy)propane.

13. The epoxy adhesive composition of claim 1, wherein said polyol ranges from about 0.5 to about 1.5 percent.

14. The epoxy adhesive composition of claim 1, wherein the amine hardener comprises xylenediamine.

15. A method for joining a first substrate having a first surface to a second substrate having a second surface with an adhesive composition, which comprises the steps of: (a) applying said adhesive composition to one or more of said first surface or said second surface, said adhesive composition comprising: (i) an epoxy resin; (ii) an amine hardener for said epoxy resin selected from the group consisting of an aliphatic polyamine modified by condensation with a tall oil fatty acid, a Mannich base, an aromatic polyamine, an amidoamine and a polyamide; and (iii) a synergistic accelerator comprising about 0.1% to about 3% based on weight of the epoxy resin of an aliphatic polyhydric polyol containing from about 2 to about 15 carbon atoms and bearing from about 2 to about 10 hydroxyl functionality groups, and an effective amount of an aromatic dihydric phenol having between about 6 and about 24 carbon atoms; (b) joining said first and second surfaces; and (c) applying pressure to said joined first and second surfaces to cure said adhesive composition.

16. The method of claim 15, wherein said substrates are one or more of sheet molding compound (SMC) or metal.

17. The method of claim 16, wherein said metal is one or more of hot dipped galvanized steel, electro galvanized steel, e-coat steel, cold rolled steel, bare aluminum, anodized aluminum, etched aluminum, or magnesium.

18. The method of claim 15, which comprises the additional step of heating said joined surfaces.

19. The method of claim 18, wherein said joined surfaces are heated at a temperature above about 82° C.

20. The method of claim 15, wherein said dihydric phenol has between from about 6 and about 18 carbon atoms.

21. The method of claim 15, wherein said dihydric phenol is one or more of catechol, resorcinol, 3-hydroxybenzyl alcohol, 4-hydroxybenzyl alcohol, 1,3-dihydroxynaphthalene, 1,5-dihydroxynaphthalene, 1,7-dihydroxynaphthalene, bisphenols having the formula:

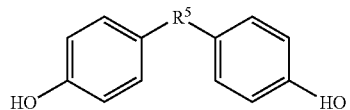

wherein $R^5$ is a bivalent radical containing 1 to 8 atoms of one or more of C, O, S or N.

22. The method of claim 21, wherein $R^5$ is an alkylene or alkylidene group containing between 1 to 8 carbon atoms.

23. The method of claim 22, wherein $R^5$ is an alkylene or alkylidene group containing 1 to 6 carbon atoms.

24. The method of claim 21, wherein said bisphenol is more or more of methylene bisphenol, isopropylidene bisphenol, butylidene bisphenol, octylidene bisphenol, bisphenol sulfide, bisphenol sulfone, bisphenol ether, or bisphenol amine.

25. The method of claim 15, wherein said polyol is one or more of propylene glycol, dipropylene glycol, tripropylene glycol, 1,4 butanediol, or 2-methyl-1,3-propanediol.

26. A joined product of a first substrate having a first surface and a second substrate having a second surface, said surfaces joined by the dried residue of an adhesive composition, said adhesive composition comprising: an epoxy adhesive composition comprising: (a) an epoxy resin; (b) an amine hardener for said epoxy resin selected from the group consisting of an aliphatic polyamine modified by condensation with a tall oil fatty acid, a Mannich base, an aromatic polyamine, an amidoamine and a polyamide; and (c) a synergistic accelerator comprising about 0.1% to about 3% based on weight of the epoxy resin of an aliphatic polyhydric polyol containing from about 2 to about 15 carbon atoms and bearing from about 2 to about 10 hydroxyl functionality groups, and an effective amount of an aromatic dihydric phenol having between about 6 and about 24 carbon atoms.

27. The joined product of claim 26, wherein said dihydric phenol has between from about 6 and about 18 carbon atoms.

28. The joined product of claim 26, wherein said dihydric phenol is one or more of catechol, resorcinol, 3-hydroxybenzyl alcohol, 4-hydroxybenzyl alcohol, 1,3-dihydroxynaphthalene, 1,5-dihydroxynaphthalene, 1,7-dihydroxynaphthalene, bisphenols having the formula:

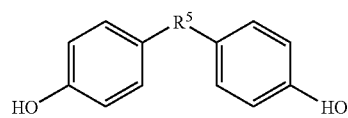

wherein $R^5$ is a bivalent radical containing 1 to 8 atoms of one or more of C, O, S or N.

29. The joined product of claim 28, wherein $R^5$ is an alkylene or alkylidene group containing between 1 to 8 carbon atoms.

30. The joined product of claim 29, wherein $R^5$ is an alkylene or alkylidene group containing 1 to 6 carbon atoms.

31. The joined product of claim 28, wherein said bisphenol is more or more of methylene bisphenol, isopropylidene bisphenol, butylidene bisphenol, octylidene bisphenol, bisphenol sulfide, bisphenol sulfone, bisphenol ether, or bisphenol amine.

32. The joined product of claim 26, wherein said polyol is one or more of propylene glycol, dipropylene glycol, tripropylene glycol, 1,4butanediol, or 2-methyl-1,3-propanediol.

* * * * *